(12) United States Patent  
Hong et al.

(10) Patent No.: US 9,129,144 B2  
(45) Date of Patent: Sep. 8, 2015

(54) RFID MIDDLEWARE SYSTEM AND METHOD OF SUPPORTING REAL-TIME BALANCING OF LOADS OF READER CONNECTIONS

(75) Inventors: Bong-Hee Hong, Yeonje-gu (KR); Woo-Seok Ryu, Yangsan-si (KR); Jun-Ho Lee, Dongnae-gu (KR)

(73) Assignee: PUSAN NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 1647 days.

(21) Appl. No.: 12/566,376

(22) Filed: Sep. 24, 2009

(65) Prior Publication Data

US 2010/0214072 A1 Aug. 26, 2010

(30) Foreign Application Priority Data

Feb. 24, 2009 (KR) ........................ 10-2009-0015251

(51) Int. Cl.
*H04L 12/26* (2006.01)
*G06K 7/00* (2006.01)
*G06K 7/10* (2006.01)

(52) U.S. Cl.
CPC .......... *G06K 7/0008* (2013.01); *G06K 7/10475* (2013.01)

(58) Field of Classification Search
None
See application file for complete search history.

(56) References Cited

U.S. PATENT DOCUMENTS

| | | | |
|---|---|---|---|
| 2002/0138287 A1* | 9/2002 | Chen et al. .................... 705/1 |
| 2005/0252971 A1* | 11/2005 | Howarth et al. .............. 235/451 |
| 2006/0161878 A1* | 7/2006 | Koh et al. ...................... 717/100 |
| 2007/0099623 A1* | 5/2007 | Stephensen et al. .......... 455/446 |
| 2007/0132589 A1* | 6/2007 | Kim et al. ..................... 340/572.1 |
| 2007/0282988 A1* | 12/2007 | Bornhoevd et al. ........... 709/223 |
| 2007/0283002 A1* | 12/2007 | Bornhoevd et al. ........... 709/224 |
| 2008/0134204 A1* | 6/2008 | Cho et al. ...................... 719/314 |
| 2009/0021343 A1* | 1/2009 | Sinha ............................. 340/5.2 |
| 2009/0134974 A1* | 5/2009 | Oh et al. ........................ 340/10.1 |
| 2009/0256682 A1* | 10/2009 | Tu et al. ......................... 340/10.1 |
| 2009/0256683 A1* | 10/2009 | Stephenson et al. .......... 340/10.1 |
| 2010/0141402 A1* | 6/2010 | Eun et al. ...................... 340/10.41 |

OTHER PUBLICATIONS

Park et al.—A Dynamic Load Balancing Approach Based on the Standard RFID Middleware Architecture—2007.*
Cui et al.—Mobile Agent Load Balancing for RFID Middlewares—2007.*
Park et al.—Dynamic management of Adaptor Threads for Supporting Scalable RFID Middleware—Dynamics in Logistics: Second International Conference Aug. 2009, 2011.*

* cited by examiner

*Primary Examiner* — Marsha D Banks Harold
*Assistant Examiner* — Christopher Wyllie
(74) *Attorney, Agent, or Firm* — Sherr & Jiang, PLLC

(57) ABSTRACT

Disclosed is radio frequency identification (RFID) middleware system and method of detecting the load of reader connections occurs during the middleware is running and balancing the load in real-time so as to minimize a decrease of the performance of the RFID middleware system. The RFID middleware system comprises: a client; a RFID middleware; RFID readers; and RFID tags, wherein the RFID middleware comprises: a middleware engine which filters tag events collected according to queries registered in the client; and a reader framework which detects the load of the connections of the RFID readers occurs while the RFID middleware is running and balances the load in real-time.

9 Claims, 10 Drawing Sheets

RFID MIDDLEWARE SYSTEM AND METHOD OF SUPPORTING REAL-TIME BALANCING OF LOADS OF READER CONNECTIONS

CROSS-REFERENCE TO RELATED PATENT APPLICATION

This application claims the benefit of Korean Patent Application No. 10-2009-0015251, filed on Feb. 24, 2009, in the Korean Intellectual Property Office, the disclosure of which is incorporated herein in its entirety by reference.

BACKGROUND OF THE INVENTION

1. Field of the Invention

The present invention relates to system and method of supporting connections of a plurality of radio frequency identification (RFID) readers, and more particularly, to RFID middleware system and method of balancing the load occurring while the RFID middleware is running in real-time so as to improve the performance of the RFID middleware system.

2. Description of the Related Art

A Radio Frequency Identification (RFID) technology, which is a non-contact type radio identification technology, provides a network management mechanism and thus is regarded as the main technology in ubiquitous computing. Also, applied fields of the RFID technology are being widely expanded in various areas such as distribution, physical distribution, transportation, finance, and environment under the control of EPCglobal, which is an organization set up to achieve world-wide standardization.

In general, a RFID system includes a RFID tag including a product ID and additional information about the product, a RFID reader for recognizing the RFID tag, and RFID middleware for filtering the recognized tag and delivering the result of the filtering to an upper-level application (client).

In the RFID system, a great number of RFID readers may be installed in large-scale applications such as transportation distribution, storage management, and warehouse management for covering a wide range of reading areas, and various RFID readers may be installed and operated at the same reading spot for improving the recognition rate for a large amount of products. Here, if a plurality of RFID middleware is operated, an operating cost may increase so that as many RFID readers as possible are to be connected to one RFID middleware.

In this case, the RFID middleware may decrease the performance of the entire system due to an increase of costs needed to process not only the load occurring due to management of the various RFID readers but also a large amount of tag data transmitted from each of the RFID readers to the RFID middleware.

Accordingly, a RFID middleware system including a reader framework for managing the RFID readers has been introduced. The reader framework includes adaptors and an adaptor manager, wherein the adaptors actually communicate with physical readers and the adaptor manager manages various adaptors. The adaptors in the system are managed by using one or more threads. In addition, as connected readers increase, the number of adaptors also increases. Thus, the load of the threads used to manage the adaptors may increase. The load of the threads may occur in both adaptor manager and adaptors. In this case, processing of the corresponding threads may be delayed and thus the performance of the RFID middleware decreases.

The threads are used for the adaptors and the adaptor manager to actively process data directly after receiving the data from the readers and the adaptors. Here, since a middleware engine and various adaptors communicate messages with each other, the adaptor manager uses a separate thread. Also, various adaptors exist according to the number of RFID readers connected to the RFID middleware so that a thread model for managing the adaptors needs to be defined.

There are two methods used to manage threads for the adaptors in the RFID middleware system.

First, a multithread model for allocating the threads to each of the adaptors is used. In the multithread model, threads that are exclusive to the adaptors are respectively allocated to the adaptors so that receiving of tag data from the readers and processing of the data may be rapidly performed. However, when the number of the connected readers increases, the number of threads also increases. Accordingly, excessive threads are generated and thus the performance of all threads existing in the system is decreased.

Second, a single thread model is used. In the single thread model, all adaptors are managed by one thread. Unlike the multithread model, operation of all adaptors is managed by one thread in the single thread model and thus an increase of the readers does not affect an increase of the threads. Thus, a large number of readers may be connected to the RFID middleware. However, as the number of adaptors increases, an amount of tag data to be processed by a common thread increases. Thus, generation of a large amount of tag data from a specific adaptor may affect the processing of tag data by all adaptors.

SUMMARY OF THE INVENTION

The present invention provides Radio Frequency Identification (RFID) middleware system and method of detecting the load of reader connections which occurs while the middleware is running and balancing the load in real-time so as to minimize a decrease of the performance of the RFID middleware system generated when a plurality of readers is connected.

The present invention also provides RFID middleware system and method of detecting the load of reader connections in middleware and balancing the load in real-time so as to connect various numbers of readers.

According to an aspect of the present invention, there is provided a RFID middleware system for supporting real-time balancing of the load of reader connections, the system including: a client; a RFID middleware; RFID readers; and RFID tags, wherein the RFID middleware includes: a middleware engine which filters tag events collected according to queries registered by the client; and a reader framework which detects the load of the connections of the RFID readers which occurs while the RFID middleware is running and balances the load in real-time.

Here, the reader framework may include: an adaptor manager which generates and removes adaptors and receives tag events from the adaptors; the adaptors which actually communicate with the RFID readers, receive tag data from the RFID readers, and convert the tag data into the tag events; and a load diagnosing unit which detects the load of the adaptors generated due to the connection of the RFID readers and the load of the adaptor manager and balances the loads in real-time.

According to another aspect of the present invention, there is provided a method of supporting real-time balancing of the load of reader connections in a RFID middleware system, the method including: group merging by which two groups (threads) in a current system are merged into one group, when the load is detected in an adaptor manager; splitting any one of the groups in the current system into two groups when the load is detected in an adaptor and allocating the adaptor, in which the load is detected, to the splitted new group; when the allocating is not possible, selecting any one of the groups in the current system and moving the adaptor, in which the load is detected, to the selected group or exchanging the adaptor, in which the load is detected, with an adaptor included in the selected group.

The group merging may include: a first determination process determining where the load occurs, when the load is detected by the load diagnosing unit; selecting first and second threads having the minimum load, when the load occurs in the adaptor manager as a result of the first determination process; and selecting one thread (first thread) from the selected first and second threads and merging all adaptors included in the two groups (first and second threads) into the selected first thread.

The splitting and the allocating may include: a first determination process determining where the load occurs, when the load is detected by the load diagnosing unit; when the load occurs in the adaptor as a result of the first determination process, selecting an adaptor (first adaptor) having the maximum load from a corresponding thread (third thread) including the adaptor, in which the load occurs; a second determination process determining whether new thread can be created in the current system; and when new thread is able to be created as a result of the second determination process, generating a new thread (fourth thread) and group splitting by inclusion of the selected first adaptor having the maximum load in the fourth thread.

The moving or the exchanging may include: a second determination process determining whether new thread can be created in the current system; when new thread is not able to be generated as a result of the second determination process, selecting a thread (fifth thread) having the minimum load in the current system, a third determination process determining whether the selected fifth thread manage only one adaptor; when only second adaptor is managed in the selected fifth thread as a result of the third determination process, exchanging the first adaptor and the second adaptor with each other; when two or more adaptors are managed in the selected fifth thread as a result of the third determination process, moving the first adaptor to the fifth thread.

According to another aspect of the present invention, there is provided a method of supporting real-time balancing of the load of reader connections in a RFID middleware system, the method including: a first determination process determining where load can be created, when the load is detected by the load diagnosing unit; selecting first and second threads having the minimum load, when the load occurs in the adaptor manager as a result of the first determination process; selecting one thread (first thread) from among the selected first and second threads and merging all adaptors included in two groups (first and second threads) into the selected first thread; when the load occurs in the adaptor as a result of the first determination process, selecting an adaptor (first adaptor) having the maximum load from a corresponding thread (third thread) including the adaptor, in which the load occurs; a second determination process determining whether new thread occurs in the current system; when new thread is able to be generated as a result of the second determination process, generating a new thread (fourth thread) and group splitting by inclusion of the selected first adaptor having the maximum load in the fourth thread; when new thread is not able to be generated as a result of the second determination process, selecting a thread (fifth thread) having the minimum load in the current system; a third determination process determining whether the selected fifth thread manage only one adaptor; when only second adaptor is managed in the selected fifth thread as a result of the third determination process, exchanging the first adaptor and the second adaptor with each other; and when two or more adaptors are managed in the selected fifth thread as a result of the third determination process, moving the first adaptor to the fifth thread.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

A Radio Frequency Identification (RFID) middleware system for supporting real-time balancing of the load of reader connections and a method thereof according to an embodiment of the present invention are described as follows with reference to the accompanying drawings.

However, exemplary embodiments are not limited to the embodiments illustrated hereinafter, and the embodiments herein are rather introduced to provide easy and complete understanding of the scope and spirit of exemplary embodiments.

It should be understood that since the embodiments and drawings are only the exemplary embodiments of the invention and are not cover all technical ideas of the invention, various equivalents and modifications may exist at the filing of the present invention.

Figure 1:
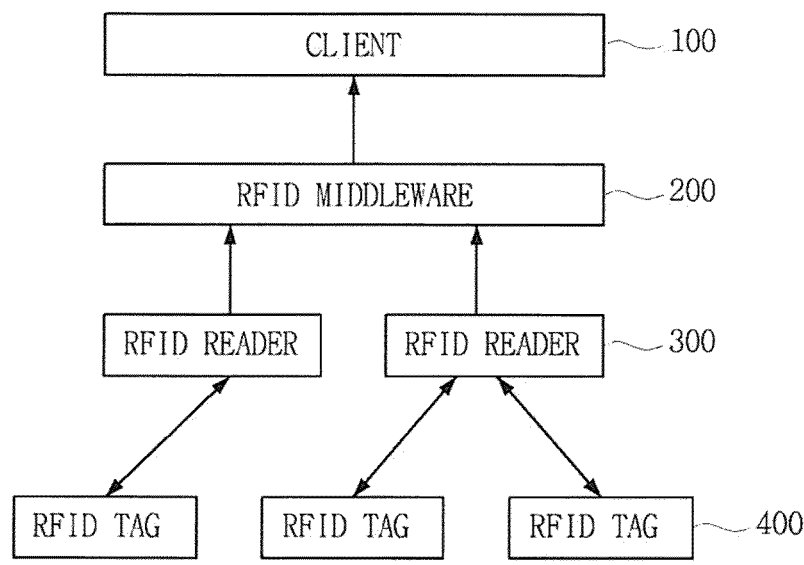
FIG. 1 illustrates a layered structure of a Radio Frequency Identification (RFID) middleware system for supporting real-time balancing of the load of reader connections, according to an embodiment of the present invention.

FIG. 1 illustrates a layered structure of a RFID middleware system for supporting real-time balancing of the load of reader connections according to an embodiment of the present invention.

Referring to FIG. 1, the RFID middleware system includes a client 100, a RFID middleware 200, RFID readers 300, and RFID tags 400.

The client 100, which includes a user program, is a program executed according to the purpose of a user by registering queries in the RFID middleware 200 and receiving tag recognition results.

The RFID middleware 200 filters and processes information of the RFID tags 400, which is transmitted from the RFID readers 300, based on the queries received from the client 100 and returns the filtered and processed information to the client 100. Also, the RFID middleware 200 detects the load of the connections of the RFID readers 300 occurs while the RFID middleware 200 is running and balances the load in real-time so that a large number of the RFID readers 300 may be connected.

The RFID readers 300 recognize the RFID tags 400 by using an inductively coupled method or an electromagnetic wave method.

The RFID tags 400 may store unique identifiers or additional information in a memory.

Figure 2A:
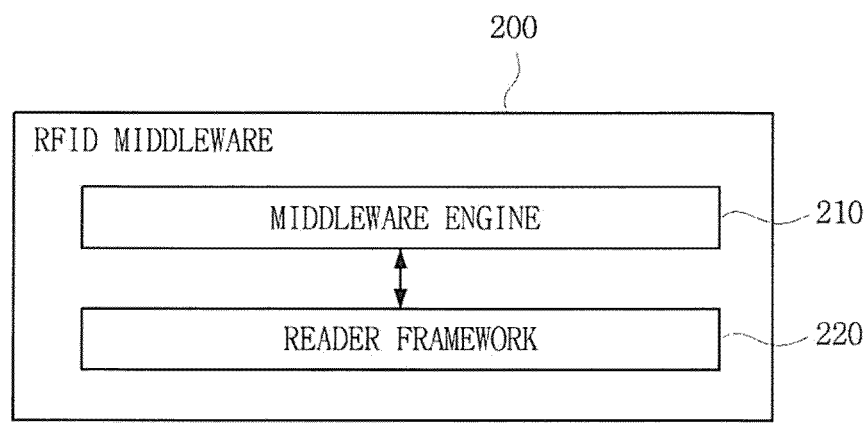
FIG. 2A illustrates a RFID middleware included in the RFID middleware system of FIG. 1, according to an embodiment of the present invention.

FIGS. 2A and 26 respectively illustrate the RFID middleware 200 in more detail and a reader framework 220 included in the RFID middleware of FIG. 2A in more detail, according to an embodiment of the present invention.

Referring FIG. 2A, the RFID middleware 200 includes a middleware engine 210 and the reader framework 220. Referring to FIG. 28, the reader framework 220 includes an adaptor manager 221, adaptors 222, and a load diagnosing unit 223.

That is, the RFID middleware 200 includes the reader framework 220 and the middleware engine 210, wherein the reader framework 220 includes the adaptor manager 221, which generates and removes the adaptors 222 and receives tag events from the adaptors 222, the adaptors 222, which actually communicate with the RFID readers 300, receive tag data from the RFID readers 300, and convert the received tag data into tag events, and the load diagnosing unit 223, which detects the loads of the adaptors 222 and the adaptor manager 221, and wherein the middleware engine 210 filters information only needed according to the queries registered by the client 100.

The middleware engine 210 filters the tag events collected according to the queries registered by the client 100, processes the filtered tag events into an appropriate form, and returns the processed tag events to the client 100.

In addition, the reader framework 220 manages the readers in the RFID middleware 200.

That is, the adaptor manager 221 included in the reader framework 220 provides single interface for the various adaptors 222, generates and removes the corresponding adaptors 222 when the corresponding adaptors 222 are connected with and disconnected from the RFID readers 300, and transmits the tag events received from each of the connected adaptors 222 to the middleware engine 210.

Also, the adaptors 222 included in the reader framework 220 are modules specialized in the connection of various kinds of RFID readers 300. The adaptors 222 are actually connected to the RFID readers 300, receive the recognized tag data from the RFID readers 300, and generate events for transmitting the received tag data to the middleware engine 210.

In addition, the load diagnosing unit 223 included in the reader framework 220 detects the loads of the adaptors 222 and the adaptor manager 221 occurs due to the connection of the RFID readers 300 and determines time to perform real-time balancing of the load.

Figure 2B:
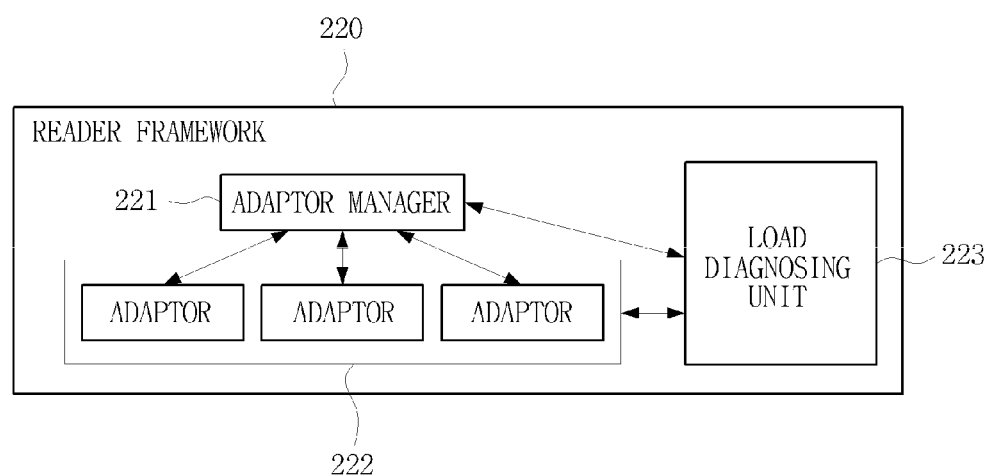
FIG. 2B illustrates a reader framework included in the RFID middleware of FIG. 2A, according to an embodiment of the present invention.

The RFID middleware system and method of supporting real-time balancing of the load of the connections of the RFID readers 300 will be described as follows. Like reference numerals in the following drawings denote like elements as in FIGS. 1, 2A, and 2B.

Figure 3:
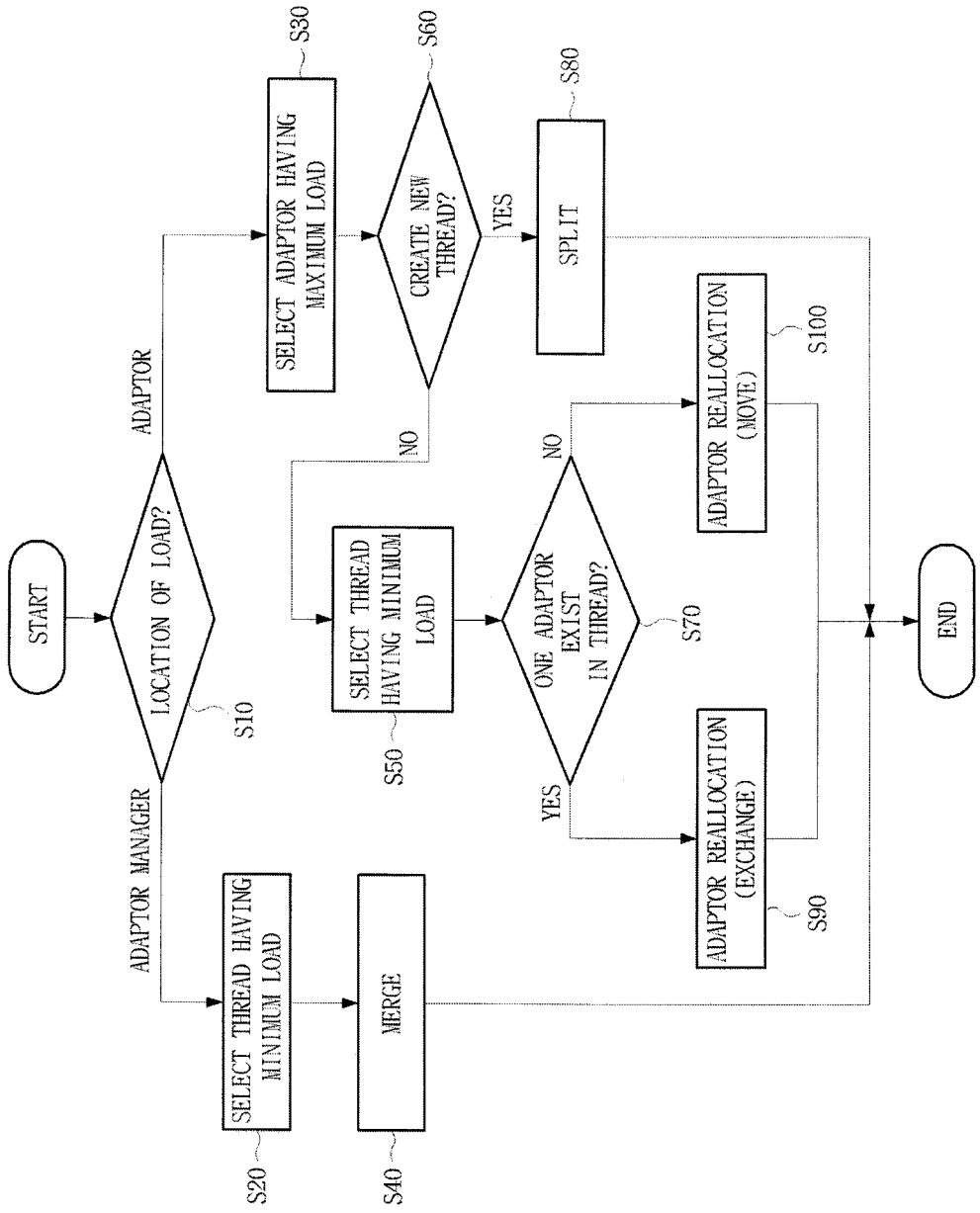
FIG. 3 is a flowchart illustrating a method of supporting real-time balancing of the load of reader connections in RFID middleware according to an embodiment of the present invention.

FIG. 3 is a flowchart illustrating a method of supporting real-time balancing of the load of reader connections in the RFID middleware 200 according to an embodiment of the present invention.

Referring to FIG. 3, the when the load is detected, the load diagnosing unit 223 determines where the load occurs (first determination), in operation S10. Here, the load of the adaptor manager 221 is determined by the load diagnosing unit 223 when an amount of messages processed in the adaptor manager 221 is decreased. The load of the adaptors 222 is determined by the load diagnosing unit 223 when the transmission of the received tag data to the adaptor manager 221 is delayed.

As a result of the first determination in operation S10, when the load occurs in the adaptor manager 221, it is determined that the load occurs due to excessive threads and thus first and second threads having the minimum loads, that is, groups, are selected, in operation S20. Here, the loads may have a value obtained by dividing a square number of tag data received in each of the adaptors 222 by a reader cycle.

Then, all adaptors 222 included in both groups are merged into the first thread, in operation S40, so that the selected first and second thread groups may be managed as one thread (first thread) in order to reduce the number of threads. As a result, the number of threads in the system may be reduced from 2 to 1.

In addition, as a result of the first determination in operation S10, when the load occurs in the adaptors 222, it is determined that the load of the adaptors 222 managed by a corresponding thread (third thread), that is, a corresponding group, including the adaptors 222, is out of the processing capability of the third thread and thus an adaptor (first adaptor) having the maximum load is selected as the adaptor to be removed from the corresponding group, in operation S30.

Then, whether new thread can be created in the current system is determined (second determination), in operation S60. The determination may be performed by using the number of threads when the process of group merging, in operation 840, is performed.

As a result of the second determination in operation 860, when it is determined that new thread may be generated, new thread (fourth thread) is created and the selected first adaptor having the maximum load is splitted to a new group so that the first adaptor may be separately managed in the new group along with the newly generated fourth thread, in operation S80.

As a result of the second determination in operation S60, when it is determined that new thread may not be generated, a thread (fifth thread), that is, a group, having the minimum load is selected, in operation S50, in order to find out another group for accommodating the first adaptor having the maximum load. Then, whether the selected group (fifth thread) manages only one adaptor is determined (third determination), in operation 870.

As a result of the third determination in operation S70, when it is determined that only one second adaptor is managed in the selected group, the first adaptor having the maximum load is exchanged with the second adaptor, in operation 890. As a result of the third determination in operation S70, when it is determined that more than one adaptors are managed in the selected group, the first adaptor having the maximum load is moved to the selected group (the fifth thread)

having the minimum load, in operation S100. The movement to the selected group results in an increase of the number of adaptor by one in the fifth thread.

Each technique in the operations of balancing the load of the reader connections in real-time is described as follows.

Firstly, the group merging performed in operation S40 is a process of merging two groups into one group and thereby reducing the number of threads. As such, when the number of threads is reduced, the time needed for the threads of the adaptor manager 221 to operate may be sufficiently secured.

In order to merge the two groups, target groups may be firstly selected. Two groups having minimum loads at the current point of time may be selected as the target groups. The load of one adaptor is calculated by using the number of tags received from the adaptor and a reader cycle indicating the time interval of tag reception. Complexity of tag event process performed in the adaptor is proportional to a square number of tag data and thus the load may be calculated by dividing the square number of tag data received in the adaptor by the reader cycle. When a plurality of adaptors 222 exists in the group, an average of the load of each adaptor 222 is obtained.

Figure 4A:
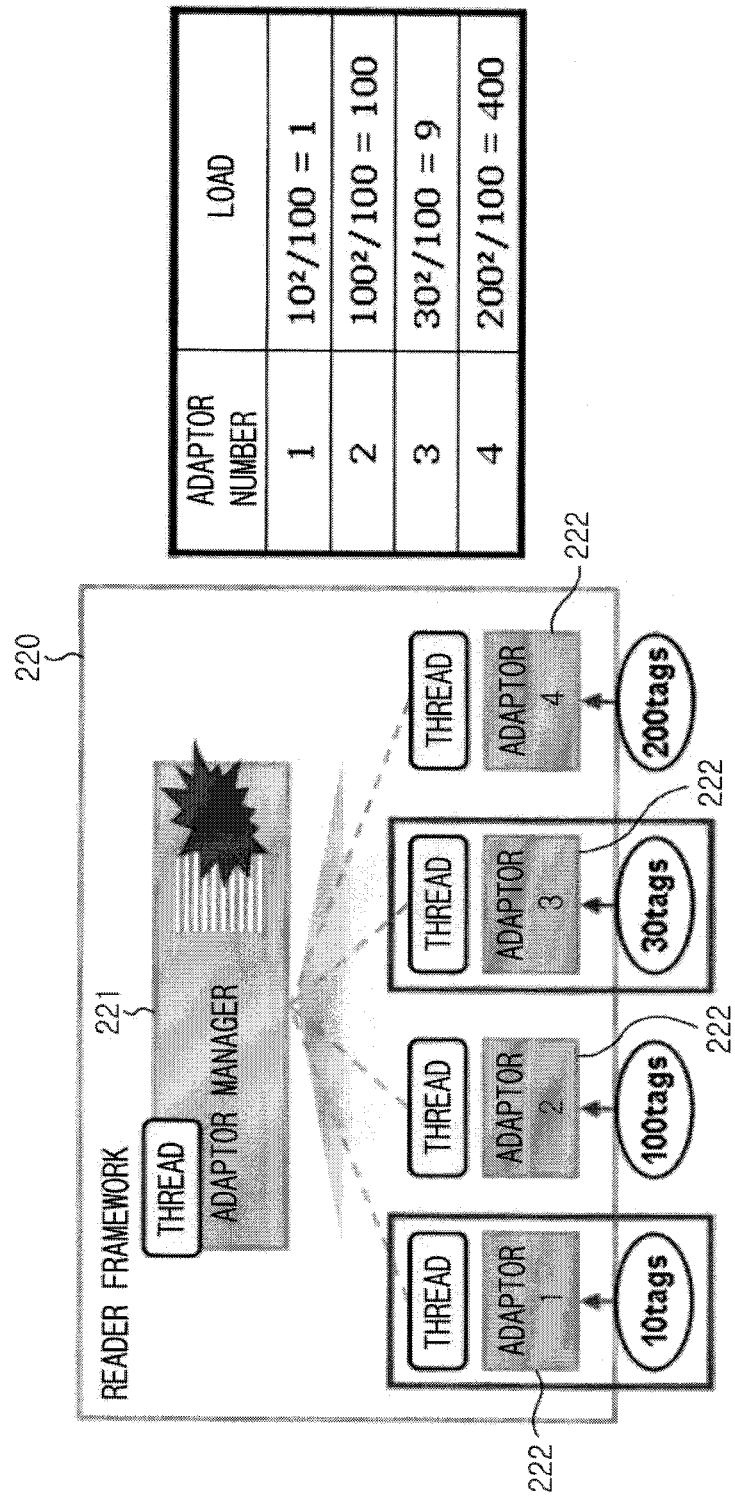
FIGS. 4A and 4B illustrate group merging of a RFID middleware system according to an embodiment of the present invention.
Figure 4B:
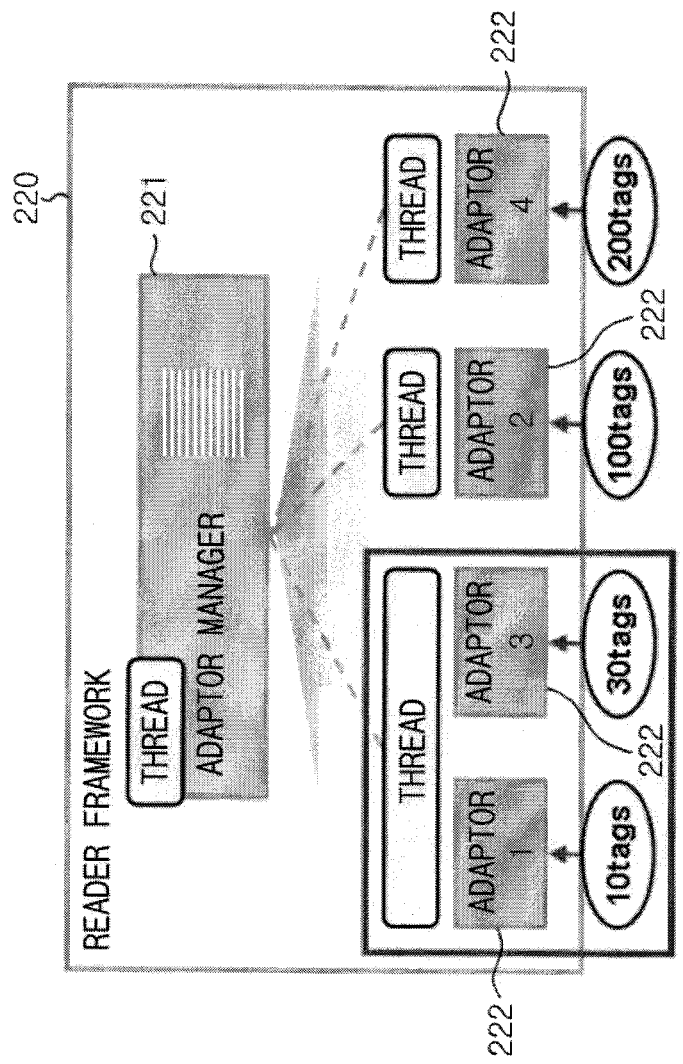

FIGS. 4A and 4B illustrate the group merging of the RFID middleware system according to an embodiment of the present invention.

Referring to FIG. 4A, selection of the target groups to be merged is illustrated.

As in FIG. 4A, it is assumed that only one adaptor 222 exists in each group and the reader cycle is the same for all groups. The groups that include An adaptor 1 and an adaptor 3 are selected as the target groups and then they are merged into one group.

Referring to FIG. 4B, the adaptor 1 and the adaptor 3 are managed as one group as a result of the group merging in FIG. 4A.

Secondly, the group splitting in operation S80 is performed when there are large numbers of adaptors 222 in a group, a large amount of tag data is received in one or more specific adaptors 222 and thus a delay occurs in processing of the tag data in all adaptors 222 by the threads of the corresponding group.

In this case, the number of adaptors 222 in the group needs to be reduced and a new group for the adaptors 222 to be allocated is created. Here, the threads for the new group may be generated in the current reader framework 220.

Figure 5A:
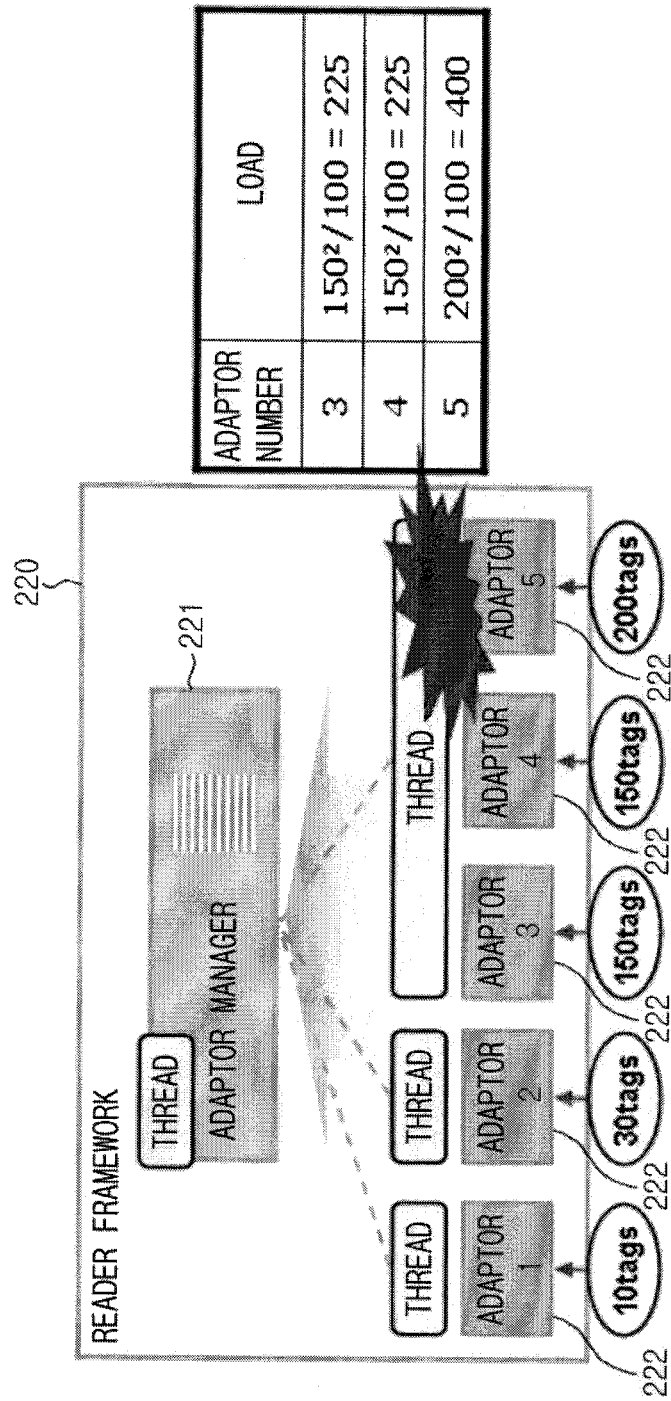
FIGS. 5A and 5B illustrate group splitting of a RFID middleware system according to an embodiment of the present invention.
Figure 5B:
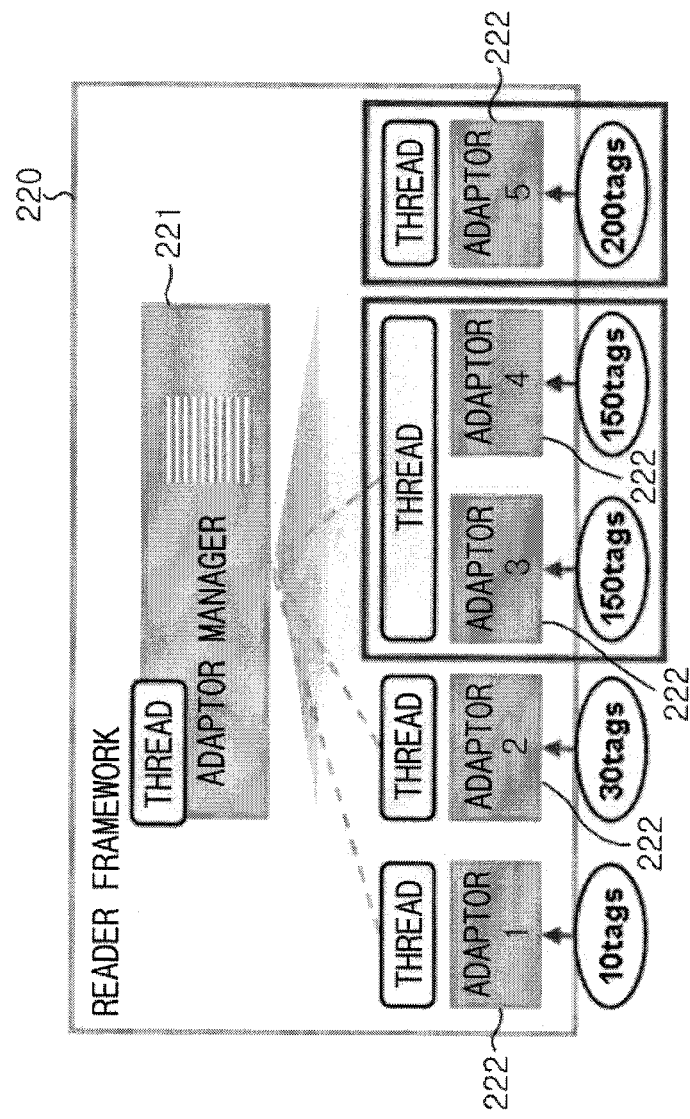

FIGS. 5A and 5B illustrate the group splitting of the RFID middleware system according to an embodiment of the present invention.

Referring to FIG. 5A, the adaptor 222 to be splitted and moved to the newly created group may be selected for the group splitting. Unlike the group merging, the group splitting does not calculate the loads of the adaptors 222 for all groups but calculates the loads with respect to the adaptors 222 of the corresponding group. As in FIG. 5A, when a delay occurs in the group that manages three adaptors 222 and it is assumed that the reader cycle is the same for all three adaptors 222, an adaptor 5 having the largest number of tags is selected as an adaptor having the maximum load. The selected adaptor 5 is allocated to the newly generated group and thus the load in the original group is reduced.

Referring to FIG. 5B, the adaptor 5 is splitted from the adaptor 3, adaptor 4, and adaptor 5 that are managed as one group and thus two groups are managed as a result of the group splitting in FIG. 5A.

Thirdly, adaptor reallocation performed in operations S90 and S100 is performed due to the same grounds as those of the group splitting and in particular, is performed when new thread may not be generated.

In the adaptor reallocation, the adaptor having the maximum load in the group, where a delay occurs in the processing of the tag data, is allocated to another group.

When the thread may not be generated and thus the group splitting may not be performed in FIG. 5A, the adaptor reallocation may be performed and a target group, to which the adaptor is reallocated, may be selected. A group having the minimum load is selected as the target group as in the group merging, in order to minimize the load of the target group after the adaptors 222 are reallocated.

The processes of the adaptor reallocation may be classified into following two processes according to the number of adaptors 222 managed by the selected target group.

First, when there is one adaptor 222 in the target group, an adaptor swapping process is used. In FIG. 5A, the group that manages the adaptor 1 having the minimum load is selected as the target group, to which the adaptor 5 having the maximum load is to be reallocated. The selected group manages only one adaptor 222, and the adaptor 1 and the adaptor 5 are exchanged with each other for maximizing smoothing process speed of the adaptor 5.

Figure 6:
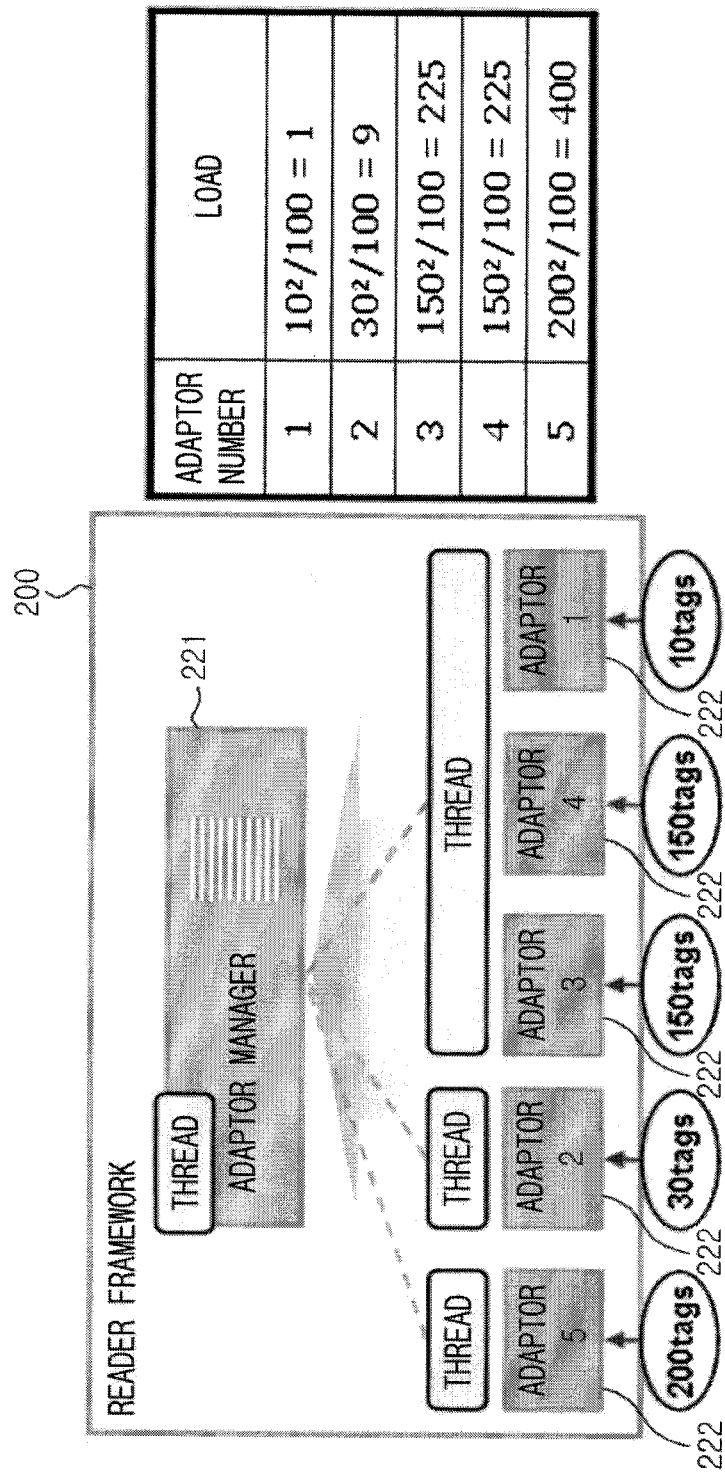
FIG. 6 illustrates adaptor reallocation performed by adaptor exchange of a RFID middleware system according to an embodiment of the present invention.

FIG. 6 illustrates the adaptor reallocation performed by the adaptor exchange of the RFID middleware system according to an embodiment of the present invention.

Referring to FIG. 6, the adaptor reallocation is performed by using the adaptor exchange with respect to FIG. 5A and the locations of the adaptor 5 and the adaptor 1 are exchanged with each other.

Figure 7A:
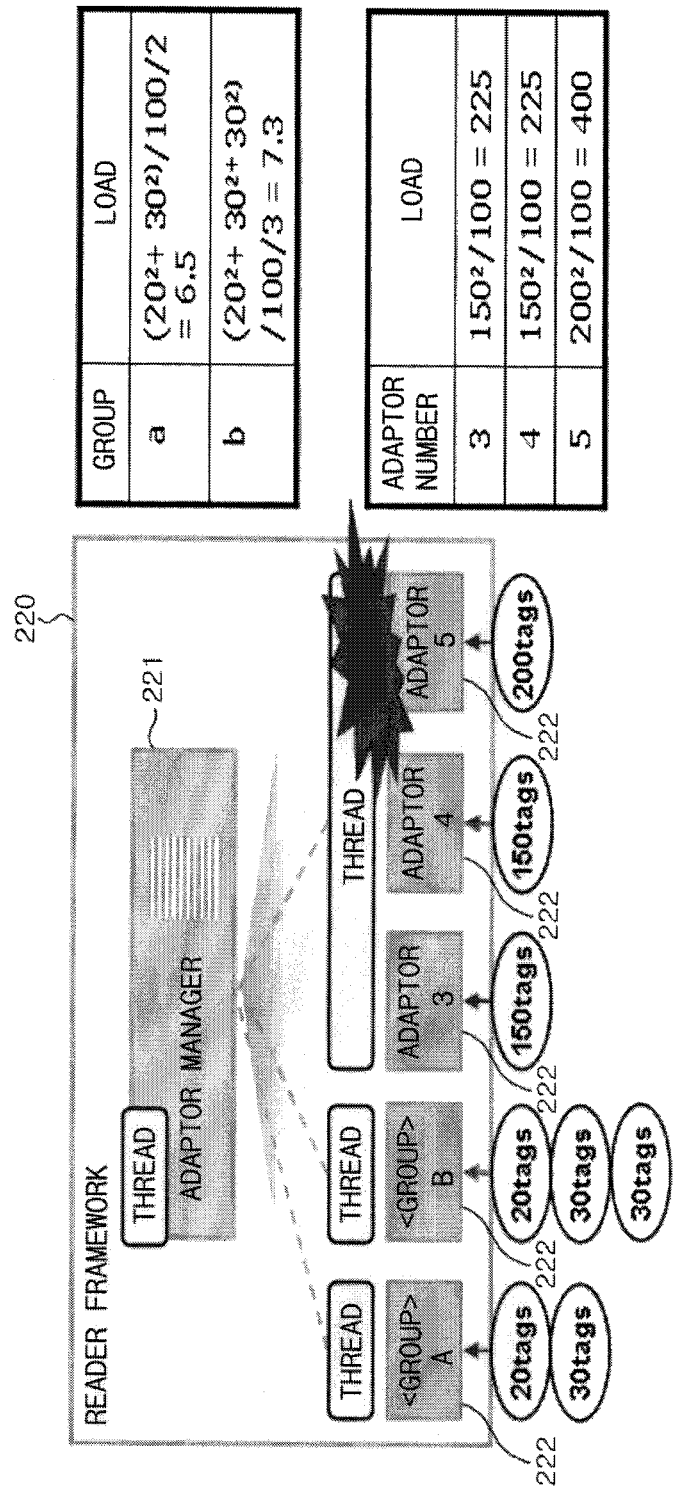
FIGS. 7A and 7B illustrate adaptor reallocation performed by adaptor movement of a RFID middleware system according to an embodiment of the present invention.
Figure 7B:
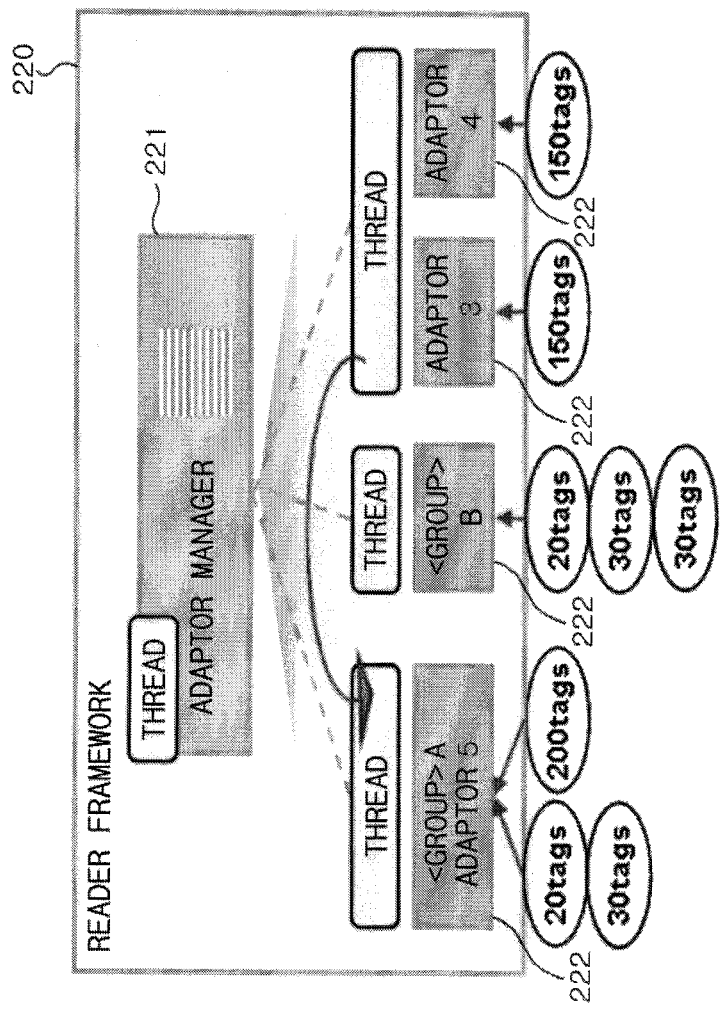

FIGS. 7A and 7B illustrate the adaptor reallocation performed by adaptor movement of the RFID middleware system according to an embodiment of the present invention.

Second, when the target group including the adaptor (adaptor 5) having the minimum load manages multiple adaptors 222 (adaptors 3, 4, and 5) as in FIG. 7A, the adaptor exchange does not occur and instead the adaptor 5 having the maximum load may be moved to the group having the minimum load.

Referring to FIG. 7B, the group A manages two adaptors 222 and the group B manages three adaptors 222, as a result of the adaptor reallocation performed by the adaptor movement. The group having the minimum load is the group A so that the adaptor 5 is moved to the group A and thus the group A manages three adaptors 222.

The RFID middleware system and method of supporting real-time balancing of the load of reader connections according to the present invention include the following effects.

Firstly, excessive number of threads created for connecting of a plurality of RFID readers are prevented and an appropriate number of threads can be maintained so that the performance of the RFID middleware system may not be deteriorated.

Secondly, the number of adaptors managed by one thread is controlled so that the capability of each thread for processing the tag data may be maximized.

Thirdly, due to the above two effects, large numbers of RFID readers may be connected in the RFID middleware system and method of supporting real-time balancing of the load of reader connections.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A radio frequency identification middleware system for supporting real-time load balancing of reader connections, the system comprising:
   a client;
   a radio frequency identification middleware;
   radio frequency identification readers; and
   radio frequency identification tags, wherein the radio frequency identification middleware includes:
      a middleware engine which filters tag events collected according to queries registered by the client; and
      a reader framework which detects the load of the connections of the radio frequency identification readers which occurs while the radio frequency identification middleware is running and balances the load in real-time,
   wherein the reader framework includes:
   adaptors which communicate with the radio frequency identification readers, receive tag data from the radio frequency identification readers, and convert the tag data into the tag events;
   an adaptor manager which creates and removes adaptors and receives tag events from the adaptors; and
      a load diagnosing unit which detects the load of the adaptors generated due to the connection of the radio frequency identification readers and the load of the adaptor manager and balances the loads in real-time.

2. A method of supporting real-time load balancing of reader connections in a radio frequency identification middleware system having a plurality of groups within the radio frequency middleware system where a group comprises a thread and an adapter, the method comprising:
   merging two groups of the plurality of groups in the radio frequency middleware system into one group, when the load is detected in an adaptor manager;
   splitting any one of the groups of the plurality of groups in the radio frequency middleware system into two groups when the load is detected in an adaptor and allocating the adaptor, in which the load is detected, to the splitted new group; and
   when the splitting is not possible, selecting any one of the groups in the radio frequency middleware system and performing one of:
      moving the adaptor, in which the load is detected, to the selected group; and
      exchanging the adaptor, in which the load is detected, with an adaptor included in the selected group.

3. The method of claim 2, wherein the group merging comprises:
   a first determination process determining where the load occurs, when the load is detected by a load diagnosing unit;
   when the load occurs in the adaptor manager as a result of the first determination process, selecting first and second threads having the minimum load; and
   selecting the first thread from among the selected first and second threads and merging all adaptors included in the first and second threads into the selected first thread.

4. The method of claim 2, wherein the splitting and the allocating comprise:
   a first determination process determining where the load occurs, when the load is detected by a load diagnosing unit;
   when the load occurs in the adaptor as a result of the first determination process, selecting a first adaptor having the maximum load from a corresponding thread including the adaptor;
   a second determination process determining whether new thread can be created in the current system; and
   when a new thread is capable of being created as a result of the second determination process, generating a new thread and group splitting by allocating of the selected first adaptor having the maximum load to the new thread.

5. The method of claim 4, wherein the second determination process is performed based on the number of threads at the time when the group merging is performed.

6. The method of claim 2, wherein the performing one of moving the adaptor and exchanging the adaptor comprises:
   a second determination process determining whether a new thread is created in the current system;
   when a new thread is not capable of being created as a result of the second determination process, selecting a thread having the minimum load in the current system;
   a third determination process determining whether the selected thread manages only one adaptor;
   when only one adaptor is managed in the selected thread as a result of the third determination process, exchanging a first adaptor and a second adaptor with each other;
   when at least two adaptors are managed in the selected thread as a result of the third determination process, moving the first adaptor to the selected thread.

7. The method of claim 6, wherein the second determination process is performed based on the number of threads at the time when the group merging is performed.

8. A method of supporting real-time load balancing of reader connections in a radio frequency identification middleware system, the method comprising:
   a first determination process determining where a load occurs, when the load is detected by the load diagnosing unit;
   selecting first and second threads having minimum loads, when the load occurs in an adaptor manager as a result of the first determination process;
   selecting a first thread from among the selected first and second threads and merging all adaptors included in two groups into the selected first thread;
   when the load occurs in an adaptor among said all adaptors as a result of the first determination process, selecting a first adaptor having the maximum load from a corresponding third thread including the adaptor, in which the load occurs;
   a second determination process determining whether a new thread is capable of being created in the current system;
   when a new thread is capable of being created as a result of the second determination process, generating a fourth thread and group splitting by allocating of the selected first adaptor having the maximum load to the fourth thread;
   when a new thread is not capable of being created as a result of the second determination process, selecting a fifth thread having the minimum load in the current system;
   a third determination process determining whether the selected fifth thread manages only a second adaptor;
   when only a second adaptor is managed in the selected fifth thread as a result of the third determination process, exchanging the first adaptor and the second adaptor with each other; and
   when at least two adaptors are managed in the selected fifth thread as a result of the third determination process, moving the first adaptor to the fifth thread.

9. The method of claim 8, wherein the second determination process is performed based on the number of threads at the time when the group merging is performed.

* * * * *